(12) United States Patent
Leonardi et al.

(10) Patent No.: US 10,051,798 B2
(45) Date of Patent: *Aug. 21, 2018

(54) VARIOUS IMPROVEMENTS TO STUMP CUTTING TOOL DISCS AND ELEMENTS THEREOF

(71) Applicant: Leonardi Manufacturing Co., Inc., Weedsport, NY (US)

(72) Inventors: Joseph A. Leonardi, Auburn, NY (US); Bruce C. Jordan, Auburn, NY (US)

(73) Assignee: LEONARDI MANUFACTURING CO., INC., Weedsport, NY (US)

( * ) Notice: Subject to any disclaimer, the term of this patent is extended or adjusted under 35 U.S.C. 154(b) by 265 days.

This patent is subject to a terminal disclaimer.

(21) Appl. No.: 14/939,555

(22) Filed: Nov. 12, 2015

(65) Prior Publication Data
US 2016/0135388 A1    May 19, 2016

Related U.S. Application Data

(60) Provisional application No. 62/078,931, filed on Nov. 12, 2014.

(51) Int. Cl.
*A01G 23/06*    (2006.01)

(52) U.S. Cl.
CPC ................... *A01G 23/067* (2013.01)

(58) Field of Classification Search
CPC .... A01G 23/091; A01G 23/06; A01G 23/067; B27G 13/00; B27G 13/02; B27G 13/04; B27G 13/06; B27G 13/08; B27G 13/10; B27G 13/12; B27C 1/02; B27C 1/04; B27C 1/005; B27C 1/14
See application file for complete search history.

(56) References Cited

U.S. PATENT DOCUMENTS

| | | | |
|---|---|---|---|
| 5,211,212 A * | 5/1993 | Carlson | A01G 23/091 144/241 |
| 5,743,314 A | 4/1998 | Puch | |
| 5,996,657 A | 12/1999 | Riesselman | |
| 7,484,541 B2 | 2/2009 | Green | |
| 8,408,258 B2 * | 4/2013 | Leonardi | A01G 23/067 144/235 |
| 8,789,566 B2 | 7/2014 | Leonardi | |
| 2010/0218851 A1 * | 9/2010 | Leonardi | A01G 23/067 144/235 |

* cited by examiner

*Primary Examiner* — Matthew G Katcoff
(74) *Attorney, Agent, or Firm* — Bond Schoeneck & King, PLLC; George McGuire; Frederick Price (57) ABSTRACT

The present invention relates to grinding tools and, more particularly, to outdoor grinding tools, and also more particularly to rotating disc assemblies (including a disc, bit subassembly, and cutting bit shield/guard assembly). The rotating disc assembly can be used for grinding tree stumps, among other things.

14 Claims, 7 Drawing Sheets

VARIOUS IMPROVEMENTS TO STUMP CUTTING TOOL DISCS AND ELEMENTS THEREOF

RELATED APPLICATIONS

The present application claims priority to U.S. Provisional Patent Application Ser. No. 62/078,931 filed Nov. 12, 2014, the entirety of which is hereby incorporated by reference.

BACKGROUND OF THE INVENTION

1. Field of the Invention

The present invention relates to grinding tools and, more particularly, to outdoor grinding tools, and also more particularly to rotating disc assemblies (including a disc, bit subassembly, and cutting bit shield/guard assembly).

2. Description of the Related Art

Stump cutting tools conventionally include a rotating disc assembly that includes a rotating disc and multiple bit sub-assemblies located at regular angular intervals on the peripheral edge of the rotating disc. For example, FIGS. 1 and 2 of U.S. Pat. No. 8,789,566 show a simplified conventional rotating disc assembly 100 including disc 102; and bit sub-assembly 104. Bit sub-assembly includes: bit holder 108; and bit 112. Conventional bit holder 108 provides a substantially rigid mechanical connection between the bit sub-assembly and the rotating disc so that there is substantially no relative motion between the bit sub-assembly and the rotating disc. Angular direction R shows the direction of rotation of the disc in operation.

Further, in FIG. 1 of U.S. Pat. No. 8,789,566, the bit sub-assembly 104 and its pocket 106 are centered at a twelve o'clock position over the center 107 of the disc. In FIG. 2 U.S. Pat. No. 8,789,566, at dotted area 112a, shows the view taken tangent to the top of the disc when the disc is in this twelve o'clock position of FIG. 1. It is this view that defines the "footprint" of the bit. This concept of a "footprint" will be important for understanding certain aspects of embodiments of present invention in the example of FIG. 1 and FIG. 2 of U.S. Pat. No. 8,789,366, the front face of the bit is substantially perpendicular to the viewing vector that defines the foot print of bit 112, but this is not necessarily always true in the prior art, or in embodiments of the present invention. Both the angular length (that is, angular length in direction R) of the bit sub-assembly and/of a non-orthogonal geometry for the bit itself can cause the front face of the bit to be non-perpendicular to the foot-print defining viewing vector. When the footprint of the bit is substantially perpendicular to the viewing vector, its footprint area will generally be at least approximately equal to the surface area of the front face of the bit. However, when the front face of the bit is not perpendicular to the viewing vector, then its footprint area will be less than the surface area of the front face of the bit.

In conventional usage, this idea of inclining the front face of the bit, forward or backward or not at all, relative to the footprint-defining viewing vector is called a "rake angle." Conventionally, rake angle is adjusted by the grinder designer depending on factors such as soil type and/or rotational speed.

For present purposes, the important thing to note is that the footprint of the bit—that is, dotted area 112a taken perpendicular to the viewing vector—is entirely exposed as the disc rotates in direction R during operation of the grinder. More specifically: (i) no portion of disc 102 is interposed in front of the footprint when viewed from the viewing vector; and (ii) no portion of bit holder 108 or any other element positioned on the rotating disc is interposed in front of the footprint of the bit as its footprint is viewed from the viewing vector. Further, the bit only cuts in the "R" direction.

Description of the Related Art Section Disclaimer: To the extent that specific patents/publications/products are discussed above in this Description of the Related Art Section or elsewhere in this Application, these discussions should not be taken as an admission that the discussed patents/publications/products are prior art for patent law purposes. For example, some or all of the discussed patents/publications/products may not be sufficiently early in time, may not reflect subject matter developed early enough in time and/or may not be sufficiently enabling so as to amount to prior art for patent law purposes. To the extent that specific patents/publications/products are discussed above in this Description of the Related Art Section and/or throughout the application, the descriptions/disclosures of which are all hereby incorporated by reference into this document in their respective entirety(ies).

SUMMARY OF THE INVENTION

The disclosure is directed to inventive rotating disc assemblies for use on a stump grinder. An embodiment can include, but is not limited to, a rotating disc assembly for use on a stump grinder including a rotating disc defining a peripheral edge; a first bit holder that is mechanically connected to the peripheral edge of the rotating disc; a first cutting bit that is mechanically connected to and positioned in front of the first bit holder, wherein the first cutting bit is structured, positioned and configured to cut in three directions; and a first shield assembly mechanically connected to a first shoulder formed on the peripheral edge of the rotating disc in front of the first cutting bit so that a footprint of the first cutting bit is at least partially shielded by a corresponding footprint of the first shield assembly.

Another embodiment can include, but is not limited to a rotating disc assembly for use on a stamp grinder including: a rotating disc defining a peripheral edge, a first bit holder that is mechanically connected to the peripheral edge of the rotating disc; a first cutting bit that is mechanically connected to and positioned in front of the first bit holder, wherein the first cutting bit is structured, positioned and configured to cut in three directions; and a first shield assembly mechanically connected to the peripheral edge of the rotating disc in front of the first cutting bit so that a footprint of the first cutting bit is at least partially shielded by a corresponding footprint of the first shield assembly, and wherein the first shield assembly comprises a layer of shock absorbing material comprising a lower relative hardness value than surrounding layers of the first shield assembly.

Column 2, line 64-column 13, line 42 and FIGS. 3-86 of U.S. Pat. No. 8,789,566, the disclosure of which is hereby incorporated by references in its entirety, provides some background on particular stump cutting tools and may serve as support for certain aspects of one or more embodiments described herein.

BRIEF DESCRIPTION OF THE DRAWINGS

The present invention will be more fully understood and appreciated by reading the following Detailed Description in conjunction with the accompanying drawings, in which.

DETAILED DESCRIPTION

The present invention will be more folly understood and appreciated by reading the following Detailed Description in conjunction with the accompanying drawings, wherein like reference numerals refer to like components.

Figure 1:
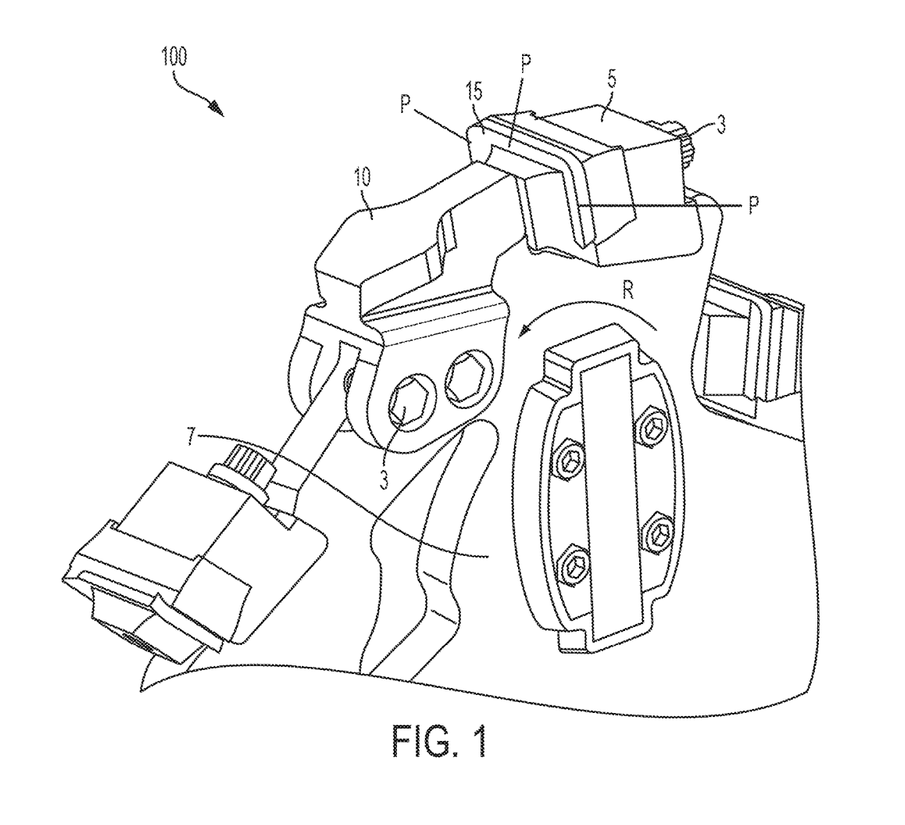
FIGS. 1 and 2 are perspective views of a rotating disc assembly, according to a first embodiment.
Figure 2:
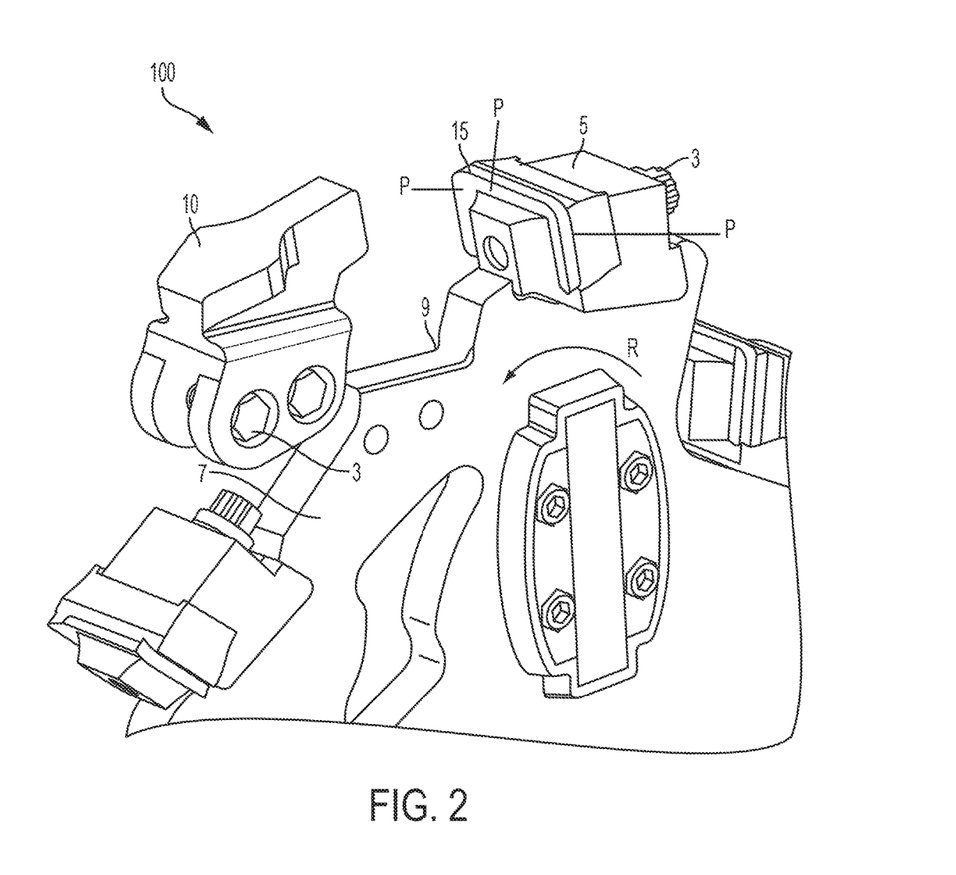

Turning to FIGS. 1-2, perspective views of a rotating disc assembly 100 are illustrated, according to a first embodiment of the present invention. The rotating disc assembly 100 includes a rotating disc 7 which rotates to the left in the "R" direction as one looks at either FIG. 1-2, when the rotating disc assembly 100 is in operation. Rotating disc 7 is shown with a bit subassembly comprising a bit holder 5 securely attached to the perimeter or peripheral edge of the rotating disc 7, a cutting bit 15 positioned in front of the bit holder 5, and a bolt 3 securing the cutting bit 15 to the bit holder 5 together and the bit to the perimeter of the rotating disc 7. The cutting bit 15 is shown fitting within a recess of the bit holder 5, where a portion of the bit holder 5 is positioned behind, underneath and in front of the cutting bit 15. The cutting bit 15 is configured, structured, and or attached to the rotating disc 7 to cut in three directions—to the left in the R direction as one looks at FIG. 1 (i.e., in a forward direction perspective to the user of the rotating disc assembly 100) and inside and outside of the page as one looks at FIG. 1 (i.e., in a side to side direction perspective to the user of the rotating disc assembly 100). In an exemplary embodiment, cutting bit 15 includes a cutting surface which can be sharper and/or more pointed than the rest of the cutting bit 15 around the perimeter P of the front of cutting bit 15. A cutting bit shield/guard assembly 10 is also shown attached to the rotating disc 7 preferably separate from (but not necessarily) and in front of the cutting bit 15 in FIG. 1, and shown detached from the rotating disc 7 in FIG. 2.

A purpose of the cutting bit shield/guard assembly 10 is to block a portion of the cutting bit 15 as it cuts in the forward direction (R direction) and in the side to side direction (essentially perpendicular to the R direction). In other words, the footprint of the cutting bit 15 can be shielded by the corresponding footprint of the cutting bit shield/guard assembly 10. The footprint of the cutting bit shield/guard assembly 10 can be configured, structured, and/or attached to the rotating disc 7 to shield at least 50% of the corresponding footprint of the cutting bit 15, and preferably at least 90% of the corresponding footprint of the cutting bit 15.

FIG. 2 shows the cutting bit shield/guard assembly 10 detached from the perimeter of the rotating disc 7. A shoulder configuration 9 (e.g., an "L" shaped "cutaway" area on the perimeter of the rotating disc 7, which can be any shaped cutaway or recess) is shown on the perimeter of the rotating disc 7 where the cutting bit shield-guard assembly 10 attaches near the bit subassembly. This shoulder configuration 9 assists with enabling the cutting bit shield/guard assembly 10 to maintain its secured position on the perimeter of the rotating disc 7 during operation. A plurality of these bit subassemblies and cutting bit shield-guard assemblies 10 can be placed around the perimeter of the rotating disc 7. The bit subassemblies and cutting bit shield/guard assemblies can be evenly spaced or randomly spaced around the perimeter of the rotating disc 7. The cutting bit shield/guard assembly 10, as shown, can be wider at the front and narrower towards the back (closer to the cutting bit 15).

Figure 3:
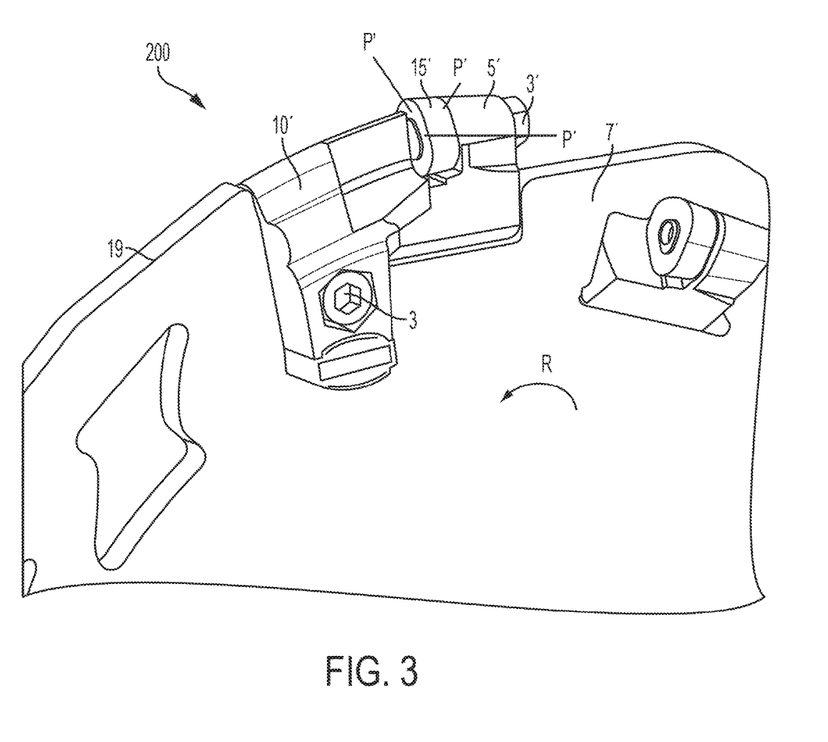
FIGS. 3-4 are perspective views of a rotating disc assembly, according to a second embodiment.
Figure 4:
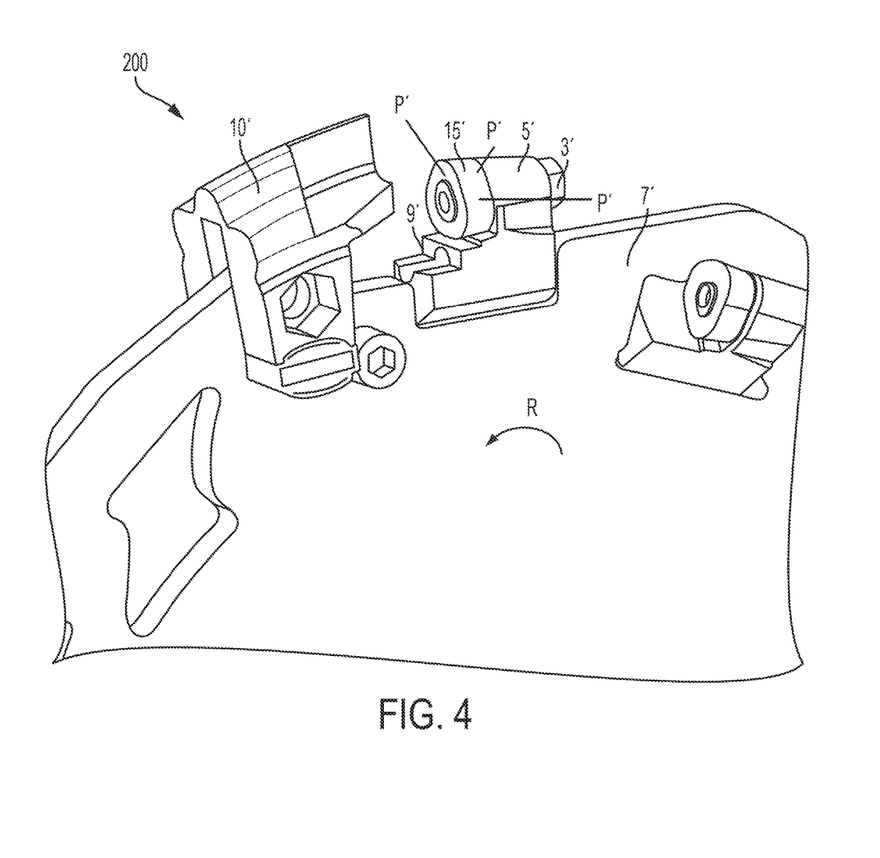

Turning to FIGS. 3-4, perspective views of a rotating disc assembly 200 are illustrated, according to a second embodiment of the present invention. The rotating disc assembly 200 rotates to the left in the "R" direction as one looks at either FIG. 3-4, when the rotating disc assembly 200 is in operation. Rotating disc 7' is shown with a bit subassembly comprising a bit holder 5' securely attached to the perimeter or peripheral edge of the rotating disc 7', a cutting bit 15' positioned in front of the bit holder 5', and a bolt 3' securing the cutting bit 15' to the bit holder 5' together and the bit to the perimeter of the rotating disc 7'. The cutting bit 15' is configured, structured, and/or attached to the rotating disc 7' to cut in three directions—to the left and in the R direction as one looks at FIG. 3 (i.e., in a forward direction perspective to the user of the rotating disc assembly 200)—and inside and outside of the page as one looks at FIG. 3 (i.e., in a side to side direction perspective to the user of the rotating disc assembly 200). In an exemplary embodiment, cutting bit 15' includes a cutting surface which can be sharper and/or more pointed than the rest of the cutting bit 15' around the perimeter P' of the front of cutting bit 15'. A cutting bit shield/guard assembly 10' is also shown attached to the rotating disc 7' preferably separately from (but not necessarily) and in front of the cutting bit 15' in FIG. 3, and shown detached from the rotating disc 7' in FIG. 4

A purpose of the cutting bit shield/guard assembly 10' is to block a portion of the culling bit 15' as it cuts in the forward direction (R direction) and in the side to side direction (essentially perpendicular to the R direction). In other words, the footprint of the cutting bit 15' can be shielded by the corresponding footprint of the cutting bit shield/guard assembly 10'. The footprint of the cutting bit shield/guard assembly 10' can be configured, structured, and/or attached to the rotating disc 7' to shield at least 50% of the corresponding footprint of the cutting bit 15', and preferably at least 90% of the corresponding footprint of the cutting bit 15'.

FIG. 4 shows the cutting bit shield/guard assembly 10' detached from the perimeter of the rotating disc 7'. A shoulder configuration 9' (e.g., a "stepped" configuration "cutaway" on the perimeter of the rotating disc 7, which can be any shaped cutaway or recess) is shown on the perimeter of the rotating disc 7' where the cutting bit shield/guard assembly 10' attaches near the bit subassembly. The shoulder configuration 9 can also include a section of the perimeter 19 that is positioned in front of the shield/guard assembly, which can extend almost to the same height of the cutting bit shield/guard assembly 10' (if not higher) when the cutting bit shield guard assembly 10' is positioned on the rotating disc 7'. However, cutting bit shield/guard assembly 10' is preferably thicker than the rotating disc, at least at the front portion of the cutting bit shield/guard assembly 10'. This shoulder configuration 9' assists with enabling the cutting bit shield/guard assembly 10' to maintain its secured position on the perimeter of the rotating disc 7' during operation. A plurality of these bit subassemblies and cutting bit shield/guard assemblies 10' can be placed around the perimeter of the rotating disc 7'. The bit subassemblies and cutting bit shield/guard assemblies can be evenly spaced or randomly spaced. The cutting bit shield/guard assembly 10', as shown, can be wider at the front and narrower towards the back (closer to the cutting bit 15'). In an exemplary embodiment, it can be somewhat shaped like an arrow facing in the direction of rotation, as shown in FIGS. 1-2.

Figure 5:
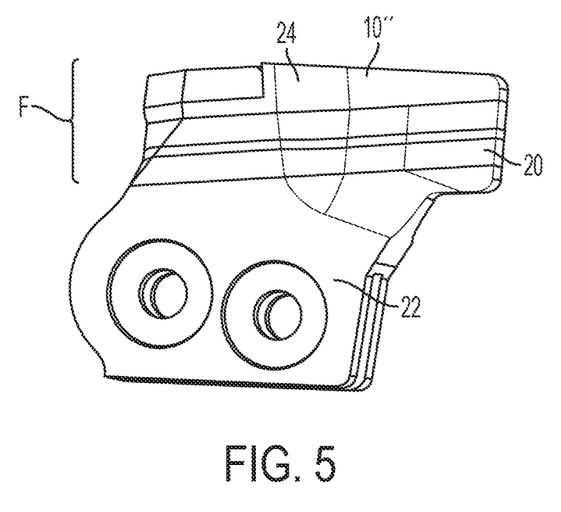
FIG. 5 is a side view of a cutting bit shield/guard assembly, according to an embodiment.
Figure 6:
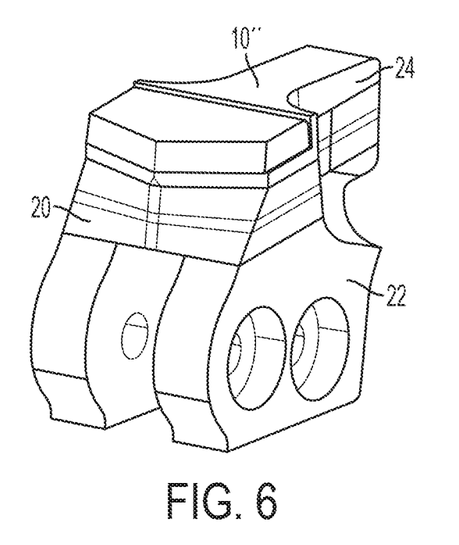
FIG. 6 is a perspective view of the cutting bit shield/guard assembly shown in FIG. 5, according to an embodiment.

Referring to FIGS. 5-6, a side view and a perspective view, respectively, of a cutting bit shield/guard assembly 10" is shown. The cutting bit shield/guard assembly 10" includes at least one layer of a shock absorbing material 20. This material contains a material with a lower relative hardness value (i.e., softer) than the surrounding top portion 24 of the cutting bit shield/guard assembly 10' and of the bottom portion 22 of the cutting bit shield/guard assembly 10", which is the portion that attaches to the perimeter of a rotating disc 7, 7'. When a rotating disc 7, 7' is spinning while in use, the shock absorbing material 20 can help absorb, spread out and/or dissipate the rotational energy when impacted by rocks, wood, or other debris.

Ideally, the inclusion of shock absorbing material 20 provides some very minor additional movement of the cutting bit shield/guard assembly 10" from the point of the shock absorbing material 20 upon impact to preserve the useful life of the cutting bit shield guard assembly 10" (prevent fracture, chipping or other damage), while at the same time maintaining the protection of the cutting bit 15 via the cutting bit shield/guard assembly's 10" positioning, shape, configuration and associated functionality (as discussed above and shown in the previous Figures).

For example, upon a lateral impact, the shock absorbing material 20 is structured, configured, and positioned to allow at least a portion of the cutting bit shield/guard assembly 10" to move in the direction of the lateral force m amount equal to 5% to 20% of its total width (while at the same time being in position to protect the cutting bit with which it is associated), and then to maw back to its original position. Similarly, for example, upon impact from the front of the cutting bit shield/guard assembly 10", the shock absorbing material 20 is structured, configured, and positioned to allow at least a portion of the cutting bit shield/guard assembly 10" to move in the direction of the head-on force opposite the rotational force of the rotating disc 7, 7' in an amount equal to 5% to 20% of its total length, height or combination thereof (while at the same time being in position to protect the cutting bit with which it is associated) and then to move back to its original position. Such movement can be a compressive movement, a movement away from the center of the rotating disc 7, 7' or a combination thereof. Any of the movement discussed herein is preferably more movement than the cutting bit shield/guard assembly 10" would have without being damaged if no shock absorbing material 20 was part of the cutting bit shield/guard assembly 10".

Figure 7:
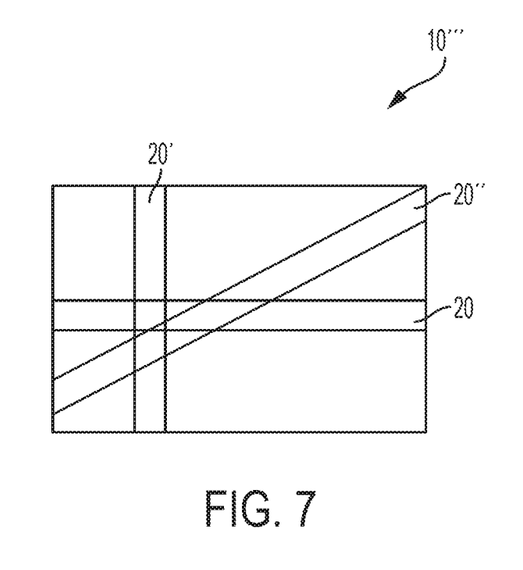
FIG. 7 is a front view schematic representation of a cutting bit shield/guard assembly, according to an embodiment.

The shock absorbing material can exist in an infinite number of various planar layers within the three dimensional cutting bit shield/guard assembly, in addition to the horizontal planar layers that are shown in FIGS. 5-6. For example, the shock absorbing material planar layers (which include a thickness, a length, and a width and can extend in a particular planar layer in order to sufficiently meet the purpose and functionality of the shock absorbing layer (including to absorb etc. part of a particular force coming from a particular direction) described herein), can exist in a planar vertical layer 20' and a planer angled layer 20" (which can be angled from the horizontal or from the vertical) as shown in FIG. 7 (which is a front schematic view of a cutting bit shield/guard assembly 10''', showing various shock absorbing material layers). Further, the shock absorbing material layers can exist together in a single cutting bit shield/guard assembly and can overlap, but do not have to FIG. 7 does not take into account depth, so shock absorbing material layer 20", for example, can start from about the front of the cutting bit shield/guard assembly 10''' and extend to the back of the cutting bit shield/guard assembly 10'''. Further, the horizontal shock absorbing material 20 layer docs not have to extend from front to back of the cutting bit shield/guard assembly 10''', and the vertical shock absorbing material 20' layer does not have to extend from top to bottom of the cutting bit shield/guard assembly 10'''. With such an infinite number of shock absorbing material layers, upon particular impacts, portions of a particular cutting bit shield/guard assembly can move in different directions as a result of the functionality of the shock absorbing material layers upon such impacts. For example, if there is a shock absorbing material vertical layer placed in the middle of a cutting bit shield/guard assembly, the part of the cutting bit shield/guard assembly in front of the shock absorbing material vertical layer could move to the left upon a right side impact while the rear portion of the cutting bit shield/guard assembly behind the shock absorbing material vertical layer could stay stationary.

As shown, the shock absorbing material 20 has a particular shape fraction where, for example, the at least one layer of the shock absorbing material 20 extends in a plane with a particular thickness that is not as wide as its length or width.

In an exemplary embodiment, the cutting bits may be made of a carbide material. In additional exemplary embodiment, the shock absorbing material may be made from a rubber with a durometer of about between 80 and 100 (shore A). In an alternative embodiment, the shock absorbing material may be made of a woven metal mesh material, which can be weaved and compressed, and can have the same properties of the shock absorbing material 20 made from the rubber with a particular high durometer. These particular exemplarily compositional configurations are preferably sufficient to meet the particular purposes/functionalities of the shock absorbing material discussed above (i.e., the durometer value and/or the weave and metal wire size of the woven mesh material can change, and long as the purposes/functionalities are met and maintained).

While several embodiments of the invention have been discussed, it will be appreciated by those skilled in the art that various modifications and variations of the present invention are possible. Such modifications do not depart from the spirit and scope of the present invention.

What is claimed is:

1. A rotating disc assembly for use on a stump grinder comprising:
    a rotating disc defining a peripheral edge;
    a first bit holder that is mechanically connected to the peripheral edge of the rotating disc;
    a first cutting bit that is mechanically connected to and positioned in front of the first bit holder, wherein the first cutting bit is structured, positioned and configured to cut in three directions; and
    a first shield assembly separately mechanically connected to a first shoulder formed on the peripheral edge of the rotating disc in front of the first cutting bit so that a footprint of the first cutting bit is at least partially shielded by a corresponding footprint of the first shield assembly.

2. The assembly of claim 1 wherein the footprint of the first cutting bit is at least 50% shielded by a corresponding footprint of the first shield assembly.

3. The assembly of claim 1 wherein the footprint of the first cutting bit is at least 90% shielded by a corresponding footprint of the first shield assembly.

4. The assembly of claim 1, wherein the first cutting bit further comprises a perimeter portion comprising at least one cutting surface.

5. The assembly of claim 1, wherein the first cutting bit is mechanically connected to the first bit holder by a fastening hardware that extends through co-axially aligned holes formed in the first bit holder and the first cutting bit and along an axis that is essentially parallel to a direction of travel of the rotating disc.

6. The assembly of claim 1, wherein the first shield assembly is mechanically connected to the first shoulder formed on the peripheral edge of the rotating disc by a fastening hardware that extends through co-axially aligned holes formed in the first shield assembly and the rotating disc and along an axis that is essentially perpendicular to a direction of travel of the rotating disc.

7. The assembly of claim 1, wherein the first cutting bit is positioned within a recess formed by the first bit holder wherein the recess includes a first portion extending in a first direction, a second portion extending from said first portion along a second direction that is not parallel to said first direction, and a third portion extending from said second portion in a third direction that is substantially parallel to and spaced from said first direction.

8. The assembly of claim 1, wherein the first shield assembly is wider at a front portion and narrower at a back portion closer to the first cutting bit.

9. The assembly of claim 1, further comprising:
a second bit holder that is mechanically connected to the peripheral edge of the rotating disc and positioned a predetermined distance from the first bit holder;
a second cutting bit that is mechanically connected to and positioned in front of the second bit holder, wherein the second cutting bit is structured, positioned and configured to cut in three directions; and
a second shield assembly mechanically connected to a second shoulder formed on the peripheral edge of the rotating disc in front of the second cutting bit so that a footprint of the second cutting bit is at least partially shielded by a corresponding footprint of the second shield assembly.

10. The assembly of claim 1, wherein the first shield assembly further comprises a layer of shock absorbing material comprising a lower relative hardness value than surrounding layers of the first shield assembly.

11. The assembly of claim 10, wherein the shock absorbing material is composed of a material with a durometer of about between 80 and 100 (shore A).

12. The assembly of claim 10, wherein upon a lateral impact, the shock absorbing material is structured, configured, and positioned within the first shield assembly to allow at least a portion of the first shield assembly to move in the direction of the lateral force an amount equal to about 5% to 20% of the first shield assembly's total width.

13. The assembly of claim 10, wherein upon a frontal impact, the shock absorbing material is structured, configured, and positioned within the first shield assembly to allow at least a portion of the first shield assembly to move in the direction of the force of the frontal impact opposite the rotational force of the rotating disc in an amount equal to about 5% to 20% of the first shield assembly's total length, height or combination thereof.

14. A rotating disc assembly for use on a stump grinder comprising:
a rotating disc defining a peripheral edge;
a first bit holder that is mechanically connected to the peripheral edge of the rotating disc;
a first cutting bit that is mechanically connected to and positioned in front of the first bit holder, wherein the first cutting bit is structured, positioned and configured to cut in three directions; and
a first shield assembly separately mechanically connected to the peripheral edge of the rotating disc in front of the first cutting bit so that a footprint of the first cutting bit is at least partially shielded by a corresponding footprint of the first shield assembly, and wherein the first shield assembly comprises a layer of shock absorbing material comprising a lower relative hardness value than surrounding layers of the first shield assembly.

* * * * *